United States Patent [19]

Folstad

[11] Patent Number: 4,785,865

[45] Date of Patent: Nov. 22, 1988

[54] MECHANICAL DEVICE FOR RELEASING TIRE BEADS FROM WHEEL RIMS

[76] Inventor: Lowell C. Folstad, Rte. 1, Box 123, Harwood, N. Dak. 58042

[21] Appl. No.: 66,046

[22] Filed: Jun. 24, 1987

[51] Int. Cl.[4] .............................................. B60C 25/06
[52] U.S. Cl. .................................................. 157/1.17
[58] Field of Search ................................. 81/1.17, 1.1

[56] References Cited

U.S. PATENT DOCUMENTS

| | | |
|---|---|---|
| 1,475,519 | 11/1923 | Snider . |
| 1,519,558 | 12/1924 | Snider . |
| 2,520,330 | 8/1950 | Northrup et al. ................... 157/1.17 |
| 2,581,086 | 1/1952 | Edenfield et al. .................. 157/1.17 |
| 2,753,923 | 7/1956 | Bowyer ............................ 157/1.17 |
| 2,900,016 | 8/1959 | Woodward ........................ 157/1.17 |
| 2,901,029 | 8/1959 | Mraz ................................ 157/1.17 |
| 2,956,620 | 10/1960 | Schwarz ........................... 157/1.17 |
| 3,648,751 | 3/1972 | Archidoit ......................... 157/1.17 |
| 3,707,179 | 12/1972 | Le Pier ............................ 157/1.17 |
| 3,771,580 | 11/1973 | Branick ............................ 157/1.17 |
| 4,256,161 | 3/1981 | Chisun ............................. 157/1.17 |
| 4,589,462 | 5/1986 | Giles ................................ 157/1.17 |

Primary Examiner—Debra Meislin
Attorney, Agent, or Firm—Kinney & Lange

[57] ABSTRACT

A device for breaking the beads of a tire, such as a farm tractor tire, from the bead seat on a rim, has a pair of jaws that clamp along the edge of the rim, with one jaw forming claws that pry between the tire and the outer flange of the rim. The jaws are clamped in place on the rim, and a pusher member is mechanically, directly actuated through a screw to push the tire substantially transversely to the plane of the rim to push the bead off the rim seat. Mechanical operation is provided, and because the pusher member can be directly operated a substantial force urging the tire bead off the bead receiving seat surface can be generated without having the device slip off the rim.

3 Claims, 3 Drawing Sheets

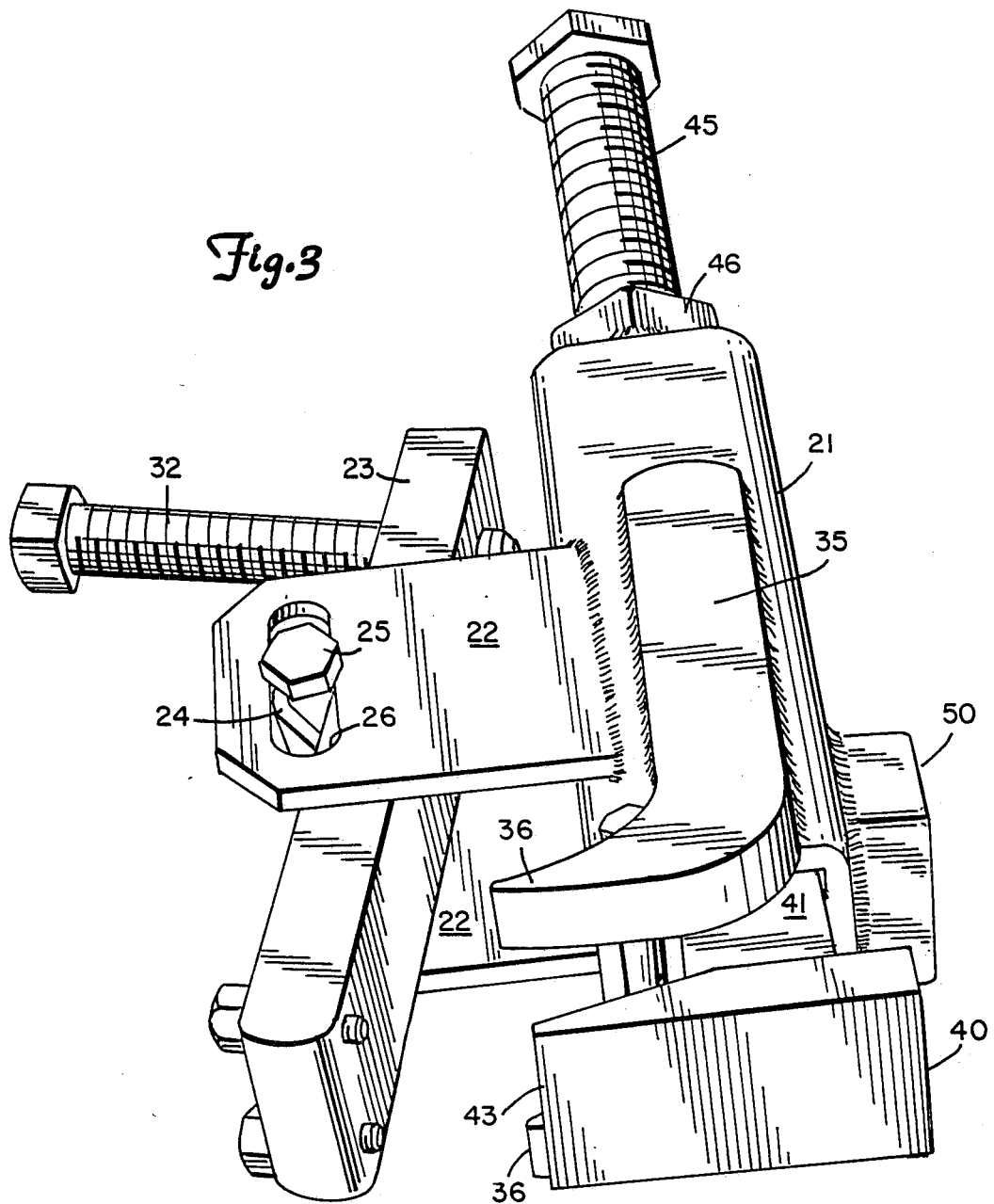

MECHANICAL DEVICE FOR RELEASING TIRE BEADS FROM WHEEL RIMS

BACKGROUND OF THE INVENTION

1. Field of the Invention

The present invention relates to a mechanical device for removing a tire bead from its seat on a vehicle wheel rim.

2. Description of the Prior Art

In the prior art, various tire removal devices have been advanced, which were designed to attempt to loosen the tire bead from a rim on which the tire was mounted. United States Pat. No. 3,707,179 shows a jaw type, mechanically operated device that mounts onto a tractor tire rim and has a jaw which is jammed down in between the bead and the peripheral flange on the rim. However, this device does not include a directly actuated pusher member that will slide the bead inwardly toward the center plane of the rim to provide a direct force tending to unseat the bead.

Another type of device comprising a tire removing tool is shown in U.S. Pat. No. 1,475,519, and it also shows a jaw type apparatus that has a laterally movable hook, that is hook-shaped and is held in place between jaws that have direct acting clamps. The present device, on the other hand, utilizes a lever clamp to clamp the unit onto the rim edge, so that greater force can be developed for holding the member in place.

Snider U.S. Pat. No. 1,519,558 shows a device operating on a tire rim that has no defined edge, where a substantially curved head is used for pushing the tire inwardly using a crank. A lever type clamp is used, but it is not adjustable for different size rims by moving the pivot point in and out, and the entire device is substantially larger than that which is necessary with the present invention.

Woodward U.S. Pat. No. 2,900,016 discloses a method of clamping a tire removal device onto a rim, and has a pusher that operates at an angle with respect to the plane of the rim that is connected to a source of air under pressure such as a hand pump or an air hose.

A device that has separate clamps, and several screws for operation, as well as a method of tightening the grip as load is applied is shown in U.S. Pat. No. 3,648,751. It too pushes against the tire at an angle, through a hook member, and does not have the direct action of the present device.

U.S. Pat. No. 2,520,330 shows a tire loosening tool that has a device pushed in under air pressure against the tire, and which is held in place with a clamp lever.

U.S. Pat. No. 2,956,620 shows a tire bead breaking device with an adjustable rim anchoring member, and further comprises a hydraulic drive for moving a device that bears against the tire.

U.S. Pat. No. 2,753,923 also shows a fluid pressure operated tire bead breaker.

None of the devices show a compact, portable, and adjustable, but yet easily used and powerful tire bead breaker.

SUMMARY OF THE INVENTION

A compact tire bead breaking device that has a pair of jaws, one of which fits underneath the rim, and is pivotally mounted to a frame. The one jaw is adjustable to move the jaw pivot in and out relative to the rim and tire. The second of the jaws comprises a pair of claws or hooks fixed to the frame and which go over the edge of the rim on which a tire is mounted, and when the first and second jaws are forced together with a threaded screw, they pivot to clamp the claws onto the rim and the lower jaw is frictionally held on the flange that holds the tire bead.

The frame that mounts the jaws has a screw operated pusher member slidably mounted therein, which has a head that will clear the rim and act against a tire bead of a tire that has its bead mounted on the rim, to push the tire directly away from the seat for the bead to slide it off with a direct force that can be applied through the direct acting screw.

The jaws can be clamped tightly, and can easily be adjusted as the member is tightened down onto the rim and against the tire. The bead loosener is manually used with conventional tools. The bead remover generates high forces, is compact, and is easily made. It also is foolproof and will not slip off the rim. It further includes a pad on the top of the frame that can be pounded to drive the claws to tighten the jaws at the same time that the jaw tightening screw is being operated to insure that the claws forming the second or fixed jaw are well-seated and will bear against the tire to provide a substantial force urging the bead off its flange on the rim.

BRIEF DESCRIPTION OF THE DRAWINGS

FIG. 3 is a perspective view of the device of FIG. 1 showing it removed from a rim to illustrate the various components;

DETAILED DESCRIPTION OF THE PREFERRED EMBODIMENTS

Figure 1:
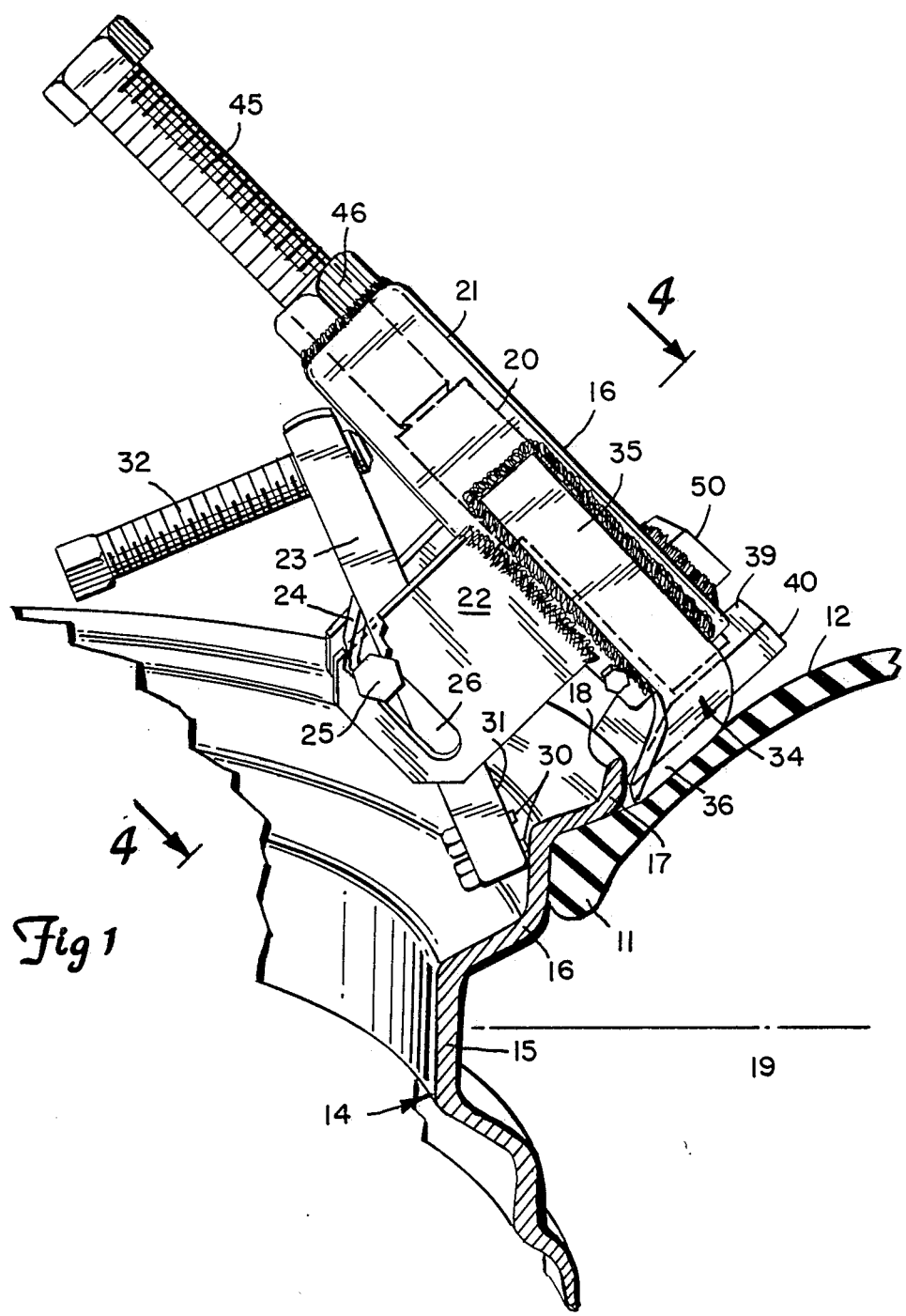
FIG. 1 is a perspective view of a tire bead removal tool made according to the present invention shown partially installed on a rim having a tire thereon.
Figure 2:
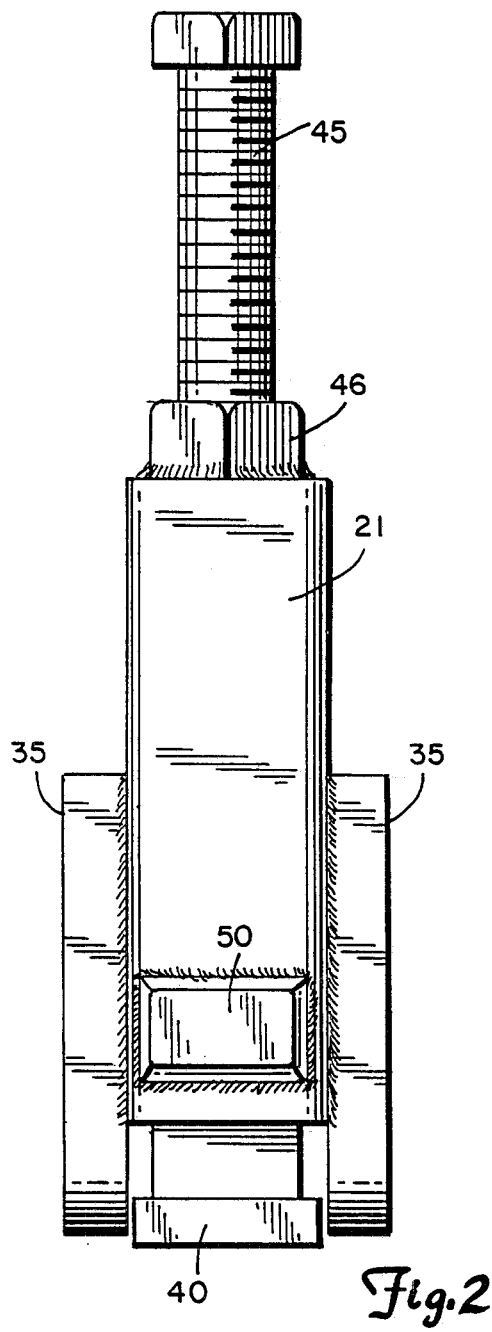
FIG. 2 is a top plan view of the device of FIG. 1.

Referring to the drawings, a tire bead removal tool indicated generally at 10 is made for sliding a bead 11 of a tire 12, such as a tractor tire, away from its seat on a rim indicated generally at 14. The rim has a drop center 15, and has an annular bead seat shoulder 16 on which the bead 11 will seat. The shoulder 16 joins an outer generally radially extending flange 17, against which the outer edge of the tire rests, and this flange 17 has an outer lip 18 that flares outwardly from the flange 17.

The rim 14 has a center plane of rotation, perpendicular to its rotational axis. The center plane is generally indicated by the line 19. The removal of the bead 11 from the bead seat shoulder 16 requires a substantial amount of force, particularly after the tire has been in service for a time. The bead removal or unseating device 10 is a compact, portable device that generates the required forces to insure that the tire beads can be removed efficiently in the field. The bead removal device 10 includes a frame 20 that has a main body or tube 21, that is a square tube. The tube 21 is heavy-walled, and rigid, and is provided with a pair of downwardly depending support straps 22,22 which are welded to the side walls of the tube and spaced apart as shown, and which thus pivotally mount a first or lower clamp jaw 23. The lower clamp jap 23 is a heavy strap, that has a pivot support member 24 in the mid-portions thereof. The pivot support houses a pivot bolt 25. The pivot bolt 25 in turn slidably and pivotally mounts in slots 26, one of which is in each strap 22, that extends generally in direction perpendicular to the rim center plane 19, so that the first jaw member 23 can be moved in and out in direction of the axis of tube 21.

The end of the first or pivoting jaw member 23 that engages the rim when in use has a pair of set screws 30 thereon which can be threaded so they protrude slightly beyond the surface 31 of the jaw to provide two points of contact for loading against the undersurface of the bead seat shoulder 16 when in use. The opposite end of the jaw 23 has a direct acting jaw clamp screw 32 threaded therethrough, which bears against the undersurface of the tube or body 21, and when the screw 32 is threaded so that the end extends upwardly as shown in FIG. 1 from the jaw 23, it will force the set screws 30 against the underside of the bead seat shoulder 16.

The frame tube 21 has a second jaw assembly 34 comprising a pair of jaw hooks or claws 35 on opposite sides thereof. The jaw hooks or claws 35 are plates welded to the sides of the tube just above the straps 22, so the claws 35 are spaced apart the same as the straps. The claws 35 extend outwardly from the end of the tube 21, and have wedge portions 36 that are tapered so that they will fit between the flange 18 of the rim and the tire, when they are forced in that direction. The tapered surface of the wedge 36 will tend to ride against the rim flange 17, past lip 18, and wedge down between the tire and the flange 17.

Thus, when the screw 32 is threaded outwardly against tube 21, the wedge portions 36 will be forced down into the rim and the jaws will be tightly clamped on the rim to hold the frame 20 in position.

A tire engaging slider or pusher member 39 has a head 40 that is mounted on a shank 41 that is slidably mounted in the tubular body 21. The head 40 has a tapered wedge end 43 that will grip and wedge in the same manner as the wedge portions 36 of the claws 35. The head 40 is positioned between the two wedge portions 36 of the claws 35, and the head 40 can be forced to slide in and out along its longitudinal axis relative to the claws 35, and in this manner can be forced toward the tire 12 that is being serviced when the jaws are clamped on the rim.

A screw 45 is threadably mounted in a threaded nut 46 that is welded to the end of the tubular body portion 21, and the inner end of the screw 45 extends inside the tube 21 and bears against the end of the shank 41 that supports the head 40. The end of the shank can have a recess to receive the end of screw 45 to tend to keep it centered. By threading the screw 45, the head 40 is pushed against the tire 12 to force it in direction away from the radial flange 17, and at the same time the jaw clamp screw 32 can be tightened to keep tightening the claws 35 of jaws 34 and 23 so that the wedge portions 36 wedge into place and seat. This also forces the wedge or spade end 43 of head 40 downward against the tire and flange 17 as well.

Figure 4:
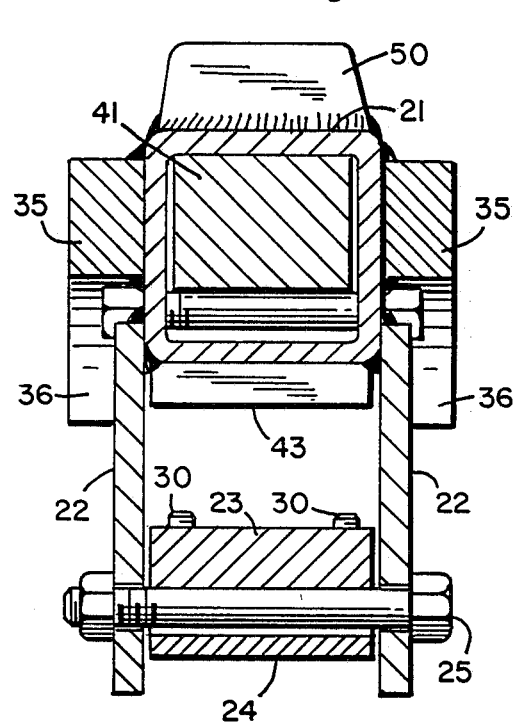
FIG. 4 is a sectional view taken on line 4—4 in FIG. 2.

The travel of the shank 41 can be restricted by a cross bolt 47 that spans the tube 21 (FIG. 4) and which slides in a groove 48 defined on the lower surfaces of shank 41. The groove 41 extends for part of the length of the shank to permit adequate movement of head 40, but still preventing the shank from falling out of the tube 21.

By continuing to tighten both the jaws and the screw 45, the tire bead 11 can be forced off its bead seat shoulder 16 for "breaking" the bead 11 loose from the rim.

The set screws 30 can be adjusted at any desired height so that it is insured that the ends of the set screws will grip against the undersurface of a tire rim bead seat shoulder 16, and the jaws will be held securely in place. The removal tool will not slip off the rim. The pivot bolt 25 can be slid in the slots 26 for adjustment so that depending on the lateral extension or outward extension of the bead seat shoulder 16 from the center plane 19 of the tire 12, the jaws can be made to fit a wide variety of different types and sizes of rims.

A pounding pad 50 is provided on a top part of the tube or body 21 adjacent the head 40, so that a hammer can be used for pounding the body 21 to force the head 40, and its spade or wedge end 43 between the tire bead 11 and the rim radial flange 17 to add additional shock loads while the screw 32 is tightened. The head 140 will be pushed into place, and that the claws 35 likewise will be tightened down easily by alternately pounding and operating the screw 32 after pounding.

The device is easily portable, easily made, and easily used as well as being reliable because of its rugged construction and direct operation to exert the necessary forces for releasing the tire from its rim.

Although the present invention has been described with reference to preferred embodiments, workers skilled in the art will recognize that changes may be made in form and detail without departing from the spirit and scope of the invention.

What is claimed is:

1. A bead breaker apparatus for loosening a tire bead that is seated on a rim, said rim having a substantially annular bead seat shoulder forming a surface on which a tire bead is seated, said shoulder having an opposite surface from the surface supporting the tire bead, and the rim having a radial flange portion to the outside of said shoulder, said bead breaker comprising a frame formed as a rectilinear cross-section tube member, jaw means on said frame including a first jaw member fixed to said frame and extending outwardly from one end thereof, said first jaw member comprising two laterally spaced apart claw members on said frame, a second jaw member, means for pivotally mounting the second jaw member on said frame at a position spaced from said first jaw member, said first jaw member and said second jaw member being adapted to fit over the radial flange of a rim, with a first end of the second jaw member under the shoulder, the means for pivotally mounting the second jaw member to the frame comprising a pair of plates fixed to sides of the tube member comprising the frame, said second jaw member being positioned between the plates, said plates having slots therein extending in longitudinal direction of the tube member, and a pivot pin slidably mounted in the slots and coupled to the second jaw member for pivotally mounting the second jaw member so the pivot axis for the second jaw member can be adjusted along the slots to accommodate rims having shoulders of different configurations, said second jaw member being elongated to have a lever portion extending on the opposite side of the pivot pin from the first end, threadable means threaded through the lever portion of said second jaw member and positioned to directly bear against said frame to pivot the first end of said second jaw member toward said first jaw member, said threadable member being on the same side of the frame as the second jaw member, and a pusher member having a head movable from a first position between the claw members of the first jaw member, said pusher member having a tang carrying the head slidably mounted in said tube member forming said frame for axial movement from its first position toward a tire mounted on a rim on which the first and second jaw members are clamped, a screw threadably mounted at an end of the tube member forming the frame to bear against the tang of the pusher member and push the pusher member toward a tire, said pusher member thereby bearing against a tire and exerting a load generally perpendicular to the plane of a rim on which such tire to be removed is mounted while the claw members engage and retain the bead breaker on such rim, and means defining a region on the tube member forming the frame on a side of the tube member opposite the second jaw member for receiving hammer blows to tend to wedge the claw members and head of the pusher member between such a tire and the rim on which the bead breaker is used.

2. The apparatus as specified in claim 1 wherein the first end of said second jaw member has set screw means threadably extending therethrough to provide a bearing point engaging a shoulder of a rim on which the jaw members are mounted.

3. The apparatus as specified in claim 1 wherein said head member of the pusher member has a spade-like end that can be wedged between a tire and a flange of a rim on which the tire is mounted and on which the jaws are attached, for forcing a tire bead on such rim inwardly toward the center plane of such rim.

* * * * *